E. R. WHITNEY.
GEARING.
APPLICATION FILED JUNE 4, 1912.

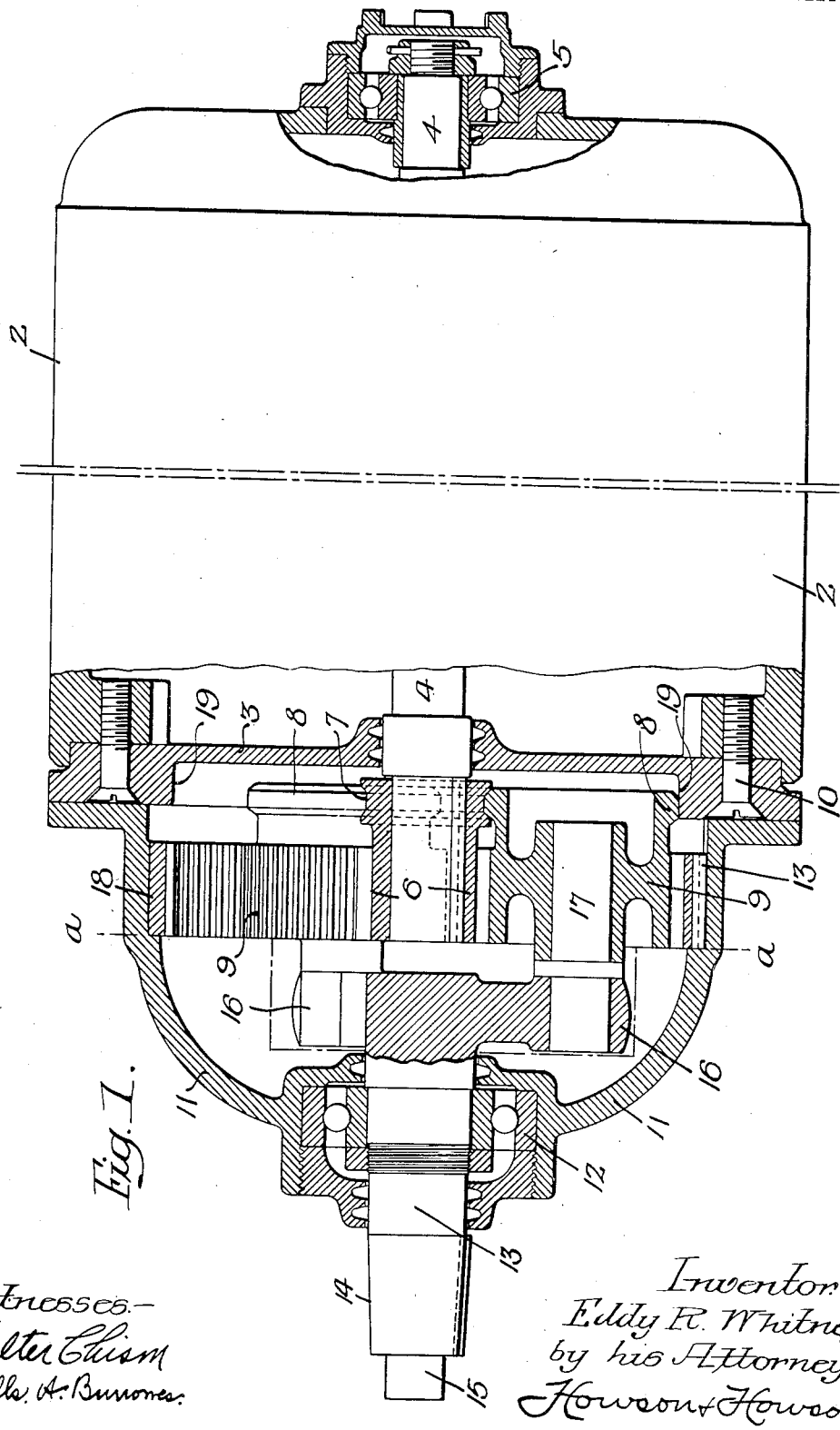

1,126,602.

Patented Jan. 26, 1915.
4 SHEETS—SHEET 2.

Witnesses:
Walter Chism
Wills H. Burrowes

Inventor:
Eddy R. Whitney,
by his Attorneys
Howson & Howson

E. R. WHITNEY.
GEARING.
APPLICATION FILED JUNE 4, 1912.
1,126,602.
Patented Jan. 26, 1915.
4 SHEETS—SHEET 4.
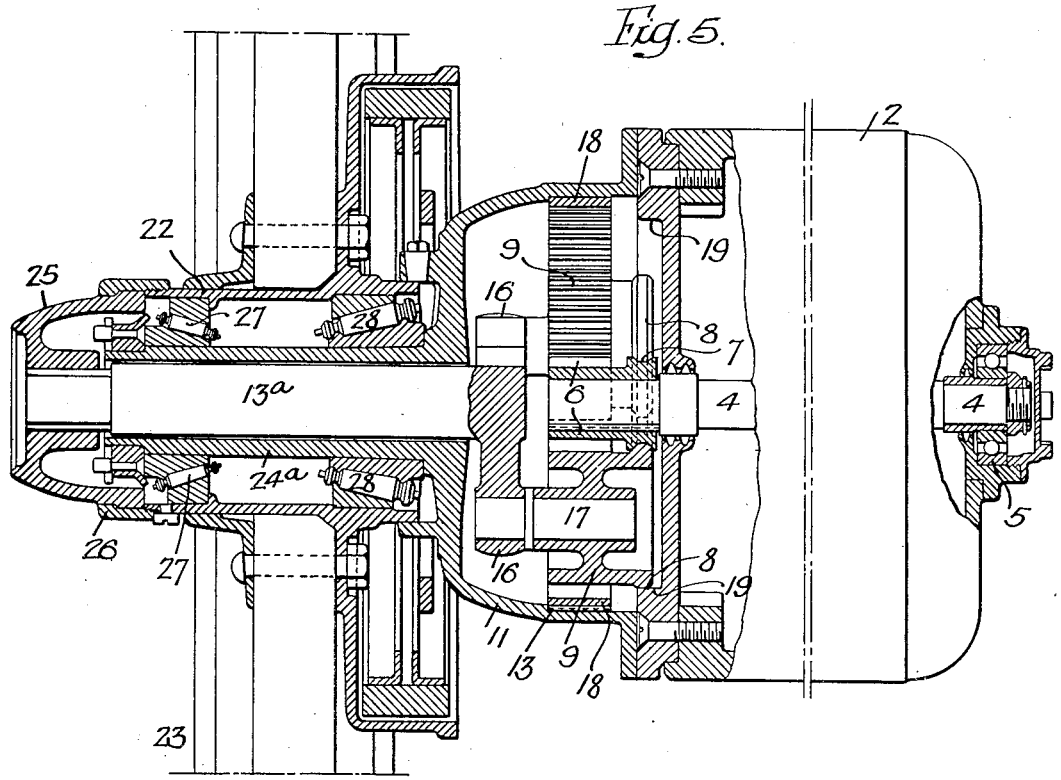
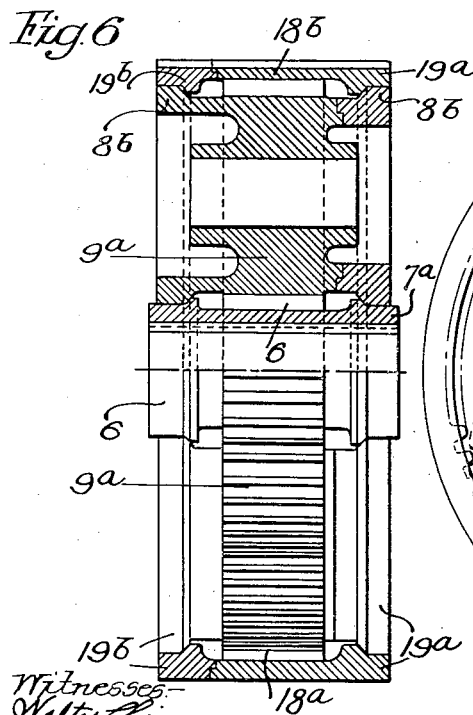
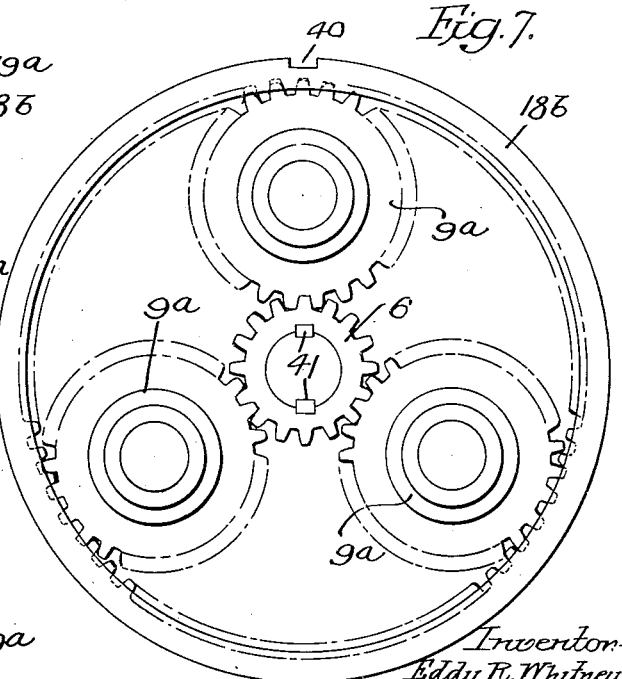
Inventor
Eddy R. Whitney,
by his Attorneys
Howson & Howson

UNITED STATES PATENT OFFICE.

EDDY R. WHITNEY, OF PHILADELPHIA, PENNSYLVANIA, ASSIGNOR TO COMMERCIAL TRUCK COMPANY OF AMERICA, OF PHILADELPHIA, PENNSYLVANIA, A CORPORATION OF PENNSYLVANIA.

GEARING.

1,126,602.  Specification of Letters Patent.  Patented Jan. 26, 1915.

Application filed June 4, 1912. Serial No. 701,605.

*To all whom it may concern:*

Be it known that I, EDDY R. WHITNEY, a citizen of the United States, residing in Philadelphia, Pennsylvania, have invented certain Improvements in Gearing, of which the following is a specification.

One object of my invention is to provide a novel construction and arrangement of gears which shall be compact, efficient and relatively inexpensive to manufacture, the invention contemplating the use of gears having cylindrical extensions in rolling engagement with each other.

A further object of my invention is to provide a gear drive particularly adapted for transmitting power from a motor to a driving wheel of a motor vehicle, which shall be relatively simple in construction and possess a high efficiency.

Another object of my invention is to provide a gear drive which, while having the above characteristics, shall omit one of the bearings customarily employed, certain of the gears being provided with extensions which serve to locate as well as support them and in some cases to support one end of a shaft.

Figure 2:
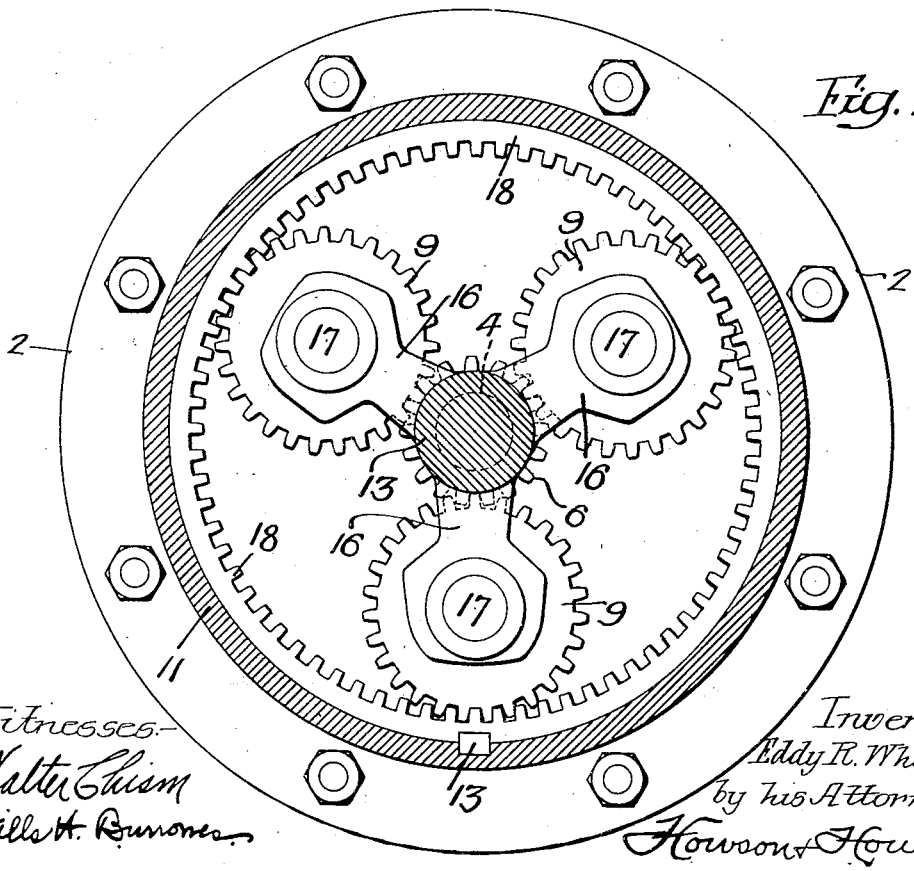
Figure 3:
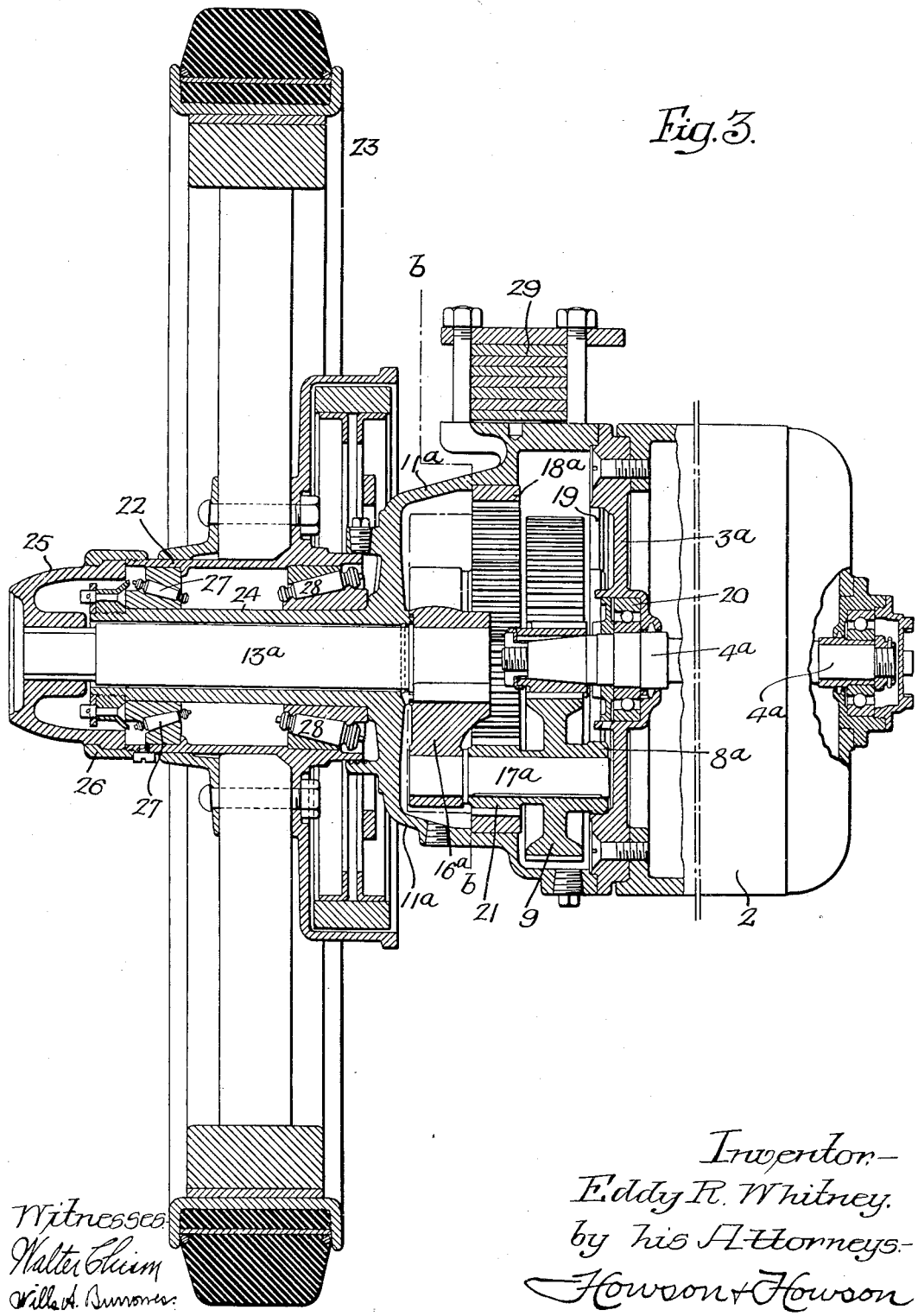

These objects and other advantageous ends I secure as hereinafter set forth, reference being had to the accompanying drawings, in which:

Figure 1 is an elevation partly in section, illustrating my invention as constructed to transmit power from a motor to the axle driven thereby; Fig. 2 is a section on the line *a—a*, Fig. 1; Fig. 3 is a side elevation, partly in section, illustrating a slightly modified form of my invention, Fig. 4 is a vertical section on the line *b—b*, Fig. 3, Fig. 5 is a vertical section of another form of my invention, and Figs. 6 and 7 are respectively a vertical section and a side elevation of a special form of my invention.

In Figs. 1 and 2 of the above drawings, I have illustrated an electric motor having a casing 2 closed at one end by a head 3. Said motor also has an armature shaft 4 carried at the end thereof distant from the head 3, by a bearing 5 and at the opposite end extended through said head so as to carry outside of it a pinion 6 and a grooved bearing wheel or roller 7. Said pinion and roller are preferably integral and it is to be noted that the diameters of the bottom of the groove of the said roller and of the pitch circle of the pinion are the same. The motor head 3 has in its outer face a cylindrical depression or recess whose curved surface is designed to receive three or more rollers 8, each of which forms part of a gear 9 and engages the roller 7 on the armature shaft 4 so as to support the same. The motor head 3 is held to the motor casing 2 in the present instance by screws of which one is shown at 10, and there is bolted to said head a second casing 11 providing a bearing 12 for an axle 13, concentric with the armature shaft 4. That portion of the axle projecting outside of the bearing has in this instance a tapered part 14 for the reception of a wheel and a threaded extremity 15 for a nut or hub cap. Inside the casing 11 the axle or driven shaft 13 has three integral arms 16 each carrying at its outer end a fixed stud or spindle 17 on which is rotatably mounted one of the gears 9, and in addition there is fixedly mounted within the casing 11, an internally toothed gear 18 in position to be engaged by the various gears 9, which before noted, also engage the armature pinion 6. This internal gear is so proportioned that its pitch circle has the same diameter as that of the cylindrical bearing 19 of the head 3.

Under operating conditions the turning of the armature shaft 4 under the action of the motor drives the pinion 6 and roller 7 thereby causing the gears 9 to roll upon the internal gear 18 and through arms 16 rotating the axle shaft 13 with the wheel which may be mounted on it. With this arrangement it will be noted that the pinion-carrying end of the armature shaft is supported through the rollers 8 of the gears 9 on the curved bearing surface 19 of the motor head, which with the rollers 8 and 7 is suitably hardened or made of hard material to reduce the wear to a minimum. Owing to the grooved form of the roller 7 and to the corresponding form of the rollers 8, transverse motion of the gears 9 relative to the gear 18 is effectually prevented and said rollers are also retained in their proper positions relatively to the curved bearing surface 19; it being noted that under normal conditions the sides of the groove in said roller 7 do not engage the sides of the rollers 8. With this construction, the frictional losses between the various parts is reduced to a minimum, since the bearing surface 19 of the head 3 has the same diameter as the pitch circle of the internal gear 18, while the diameters of the rollers 8 are the same as that of the pitch circles of the gears 9.

Figure 4:
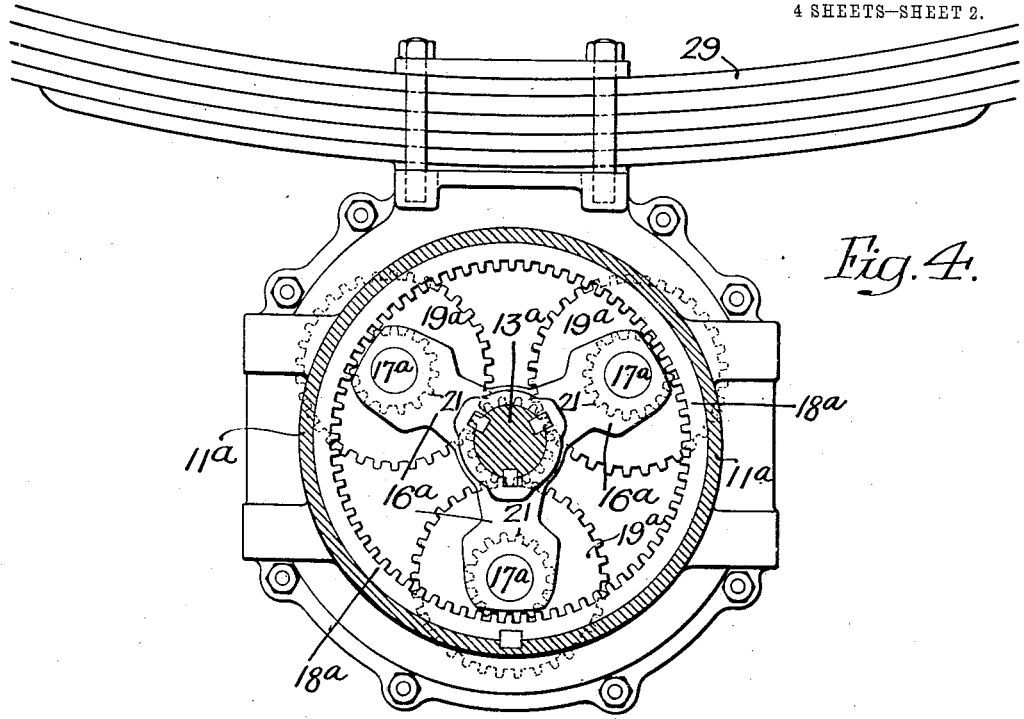

In some instances, I may arrange the parts as shown in Figs. 3 and 4, in which case the motor head $3^a$ has a bearing 20 for the pinion end of the armature shaft $4^a$. Said motor head as before, is provided with a recess providing a cylindrical bearing surface 19 engaged by rollers $8^a$ formed integral with the gears 9, which as before, are carried on studs $17^a$ projecting from arms $16^a$ formed integral with or connected to a rotary shaft $13^a$. In this case however, each of the studs or spindles $17^a$ has mounted on it a second gear 21, formed integral with a gear 9 and a roller $8^a$; the arrangement being such that said gears 21 roll on the internally toothed gear $18^a$, which as before is mounted within a casing $11^a$ and attached to the motor casing in any suitable manner. Said casing however, is provided with a tubular extension fitting into the hub 22 of the wheel 23 and the shaft $13^a$, which extends loosely through this tubular extension 24, is connected with the hub so as to turn the same by means of a hub cap 25 and coupling ring 26. Two sets of roller bearings 27 and 28 are mounted between the casing extension 24 and the wheel hub, and the wheel and motor structures are connected to the frame of the vehicle through a spring structure 29 which engages the top part of the casing $11^a$. With this arrangement of parts, the revolution of the armature shaft $4^a$ turns the gears 9 and causes the gears 21 attached thereto to roll around upon the internal gear $18^a$ whose pitch circle has the same diameter as the bearing surface 19 of the motor head $3^a$;—the rolls $8^a$ being the same in diameter as the pitch circle of the said gears 21. The armed structure or spindle $16^a$ is thus rotated, turning the shaft 13 and through the hub cap 25 and coupling 26 causing the wheel hub 22 and with it the wheel 23, to turn on the fixed structure provided by the tubular extension 24 of the casing $11^a$. While the bearing surface 19 in the recess of the head 3 is properly cylindrical in form and of the same diameter as the pitch circle of the internal gear, it is obviously possible to make it more or less conical or of a curved section without departing from my invention.

In that form of my invention shown in Fig. 5, I have shown a combination of apparatus in which the end of the armature shaft adjacent the gearing is supported by the latter in the manner illustrated in Figs. 1 and 2, although the motor casing, as in Fig. 3, is provided with a hollow projection $24^a$ adapted to form a hollow wheel axle.

It is to be understood that the gearing comprising one feature of my invention may be made and used as a complete article of manufacture, regardless of the particular apparatus for which it is employed, and in Figs. 6 and 7, I have shown said gearing as a self-contained device. In this case there is provided a central gear 8 having at both its ends a cylindrical extension forming bearing surfaces designed to coöperate with the cylindrical extensions $8^b$ of the three gears $9^a$. These latter gears, while meshing with the central gear 6, likewise mesh with and roll upon an internally toothed gear $18^b$, likewise provided with extensions $19^b$ at its opposite edges forming cylindrical bearing surfaces upon which roll the extensions $8^b$ belonging to the gears $9^a$. In the present instance, the annular structure formed by the internal gear $18^b$ and its extensions $19^b$ is provided with a keyway 40, whereby it may be connected to any desired structure while the central gear 6 is likewise provided with keys 41 for connection to a shaft.

The various gear extensions are provided with annular projections or flanges whereby they are held in proper working positions and certain of said gears may be made in a plurality of parts suitably connected together in order to permit of the assembly of the device.

I claim:

1. A motor having a casing provided with a hollow extension; a head between said extension and the main part of the casing; an armature shaft projecting through said head without engaging the same and into the hollow extension; a single bearing formed on the casing and carrying one end of the armature shaft; a second shaft in the hollow extension; and means for connecting said shafts including a plurality of gears having cylindrical extensions in rolling engagement with the armature shaft and with a bearing surface on the head respectively, the second end of the armature shaft being carried solely by said cylindrical extensions.

2. A motor having a casing provided with a hollow extension; a head between said extension and the main part of the casing; an armature shaft projecting through said head without engaging the same and into the hollow extension; a single bearing on that end of the casing distant from the head for the support of one end of said armature shaft; a second shaft projecting into the hollow extension; and gearing for connecting said shafts, the same including a gear on the armature shaft having a bearing surface, a gear mounted within the hollow extension; and a plurality of gears operatively connecting said two first gears and each provided with a cylindrical extension in engagement with the bearing surface on the head and with the cylindrical portion of the gear on the armature shaft.

In testimony whereof, I have signed my name to this specification, in the presence of two subscribing witnesses.

EDDY R. WHITNEY.

Witnesses:
WILLIAM E. BRADLEY,
JOS. H. KLEIN.